US012130792B2

(12) United States Patent
Wei et al.

(10) Patent No.: US 12,130,792 B2
(45) Date of Patent: Oct. 29, 2024

(54) DATA MERGING IN DISTRIBUTED COMPUTING SYSTEM

(71) Applicant: International Business Machines Corporation, Armonk, NY (US)

(72) Inventors: Xing Wei, Xi'an (CN); Xiao Bin Sun, Xi'an (CN); Zhe Shao, Xi'an (CN); Dong Hai Yu, Xi'an (CN); Liu Zhen Duo, Xi'an (CN); Chun Lei Xu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 17/457,301

(22) Filed: Dec. 2, 2021

(65) Prior Publication Data

US 2023/0177035 A1     Jun. 8, 2023

(51) Int. Cl.
*G06F 16/22*     (2019.01)
*G06F 16/27*     (2019.01)

(52) U.S. Cl.
CPC .......... *G06F 16/2272* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 2008/0027687 A1 | 1/2008 | Aldridge | |
| 2011/0093477 A1* | 4/2011 | Aldridge | G06F 17/18 703/2 |
| 2013/0218909 A1* | 8/2013 | Chu | G06F 16/11 707/752 |
| 2014/0114950 A1* | 4/2014 | Halverson | G06F 16/24554 707/E17.131 |
| 2015/0007079 A1 | 1/2015 | Hansen | |
| 2015/0046862 A1* | 2/2015 | Hansen | G06F 18/40 715/771 |
| 2016/0188705 A1* | 6/2016 | Schreck | G06F 16/2455 707/748 |
| 2017/0249342 A1* | 8/2017 | Dembla | G06F 16/217 |
| 2018/0181542 A1* | 6/2018 | Nica | G06F 17/18 |

(Continued)

OTHER PUBLICATIONS

Yildiz et al., "Equi-depth Histogram Construction for Big Data with Quality Guarantees," Jun. 17, 2016, 13 pages. https://arxiv.org/pdf/1606.05633.pdf.

(Continued)

*Primary Examiner* — Kris E Mackes
*Assistant Examiner* — Cao D Vuong
(74) *Attorney, Agent, or Firm* — Yee & Associates, P.C.

(57) ABSTRACT

A computer implemented method for managing datasets for a histogram. The method uses a number of processor units to determine a first span for first bins containing first datapoints in a first dataset in the datasets. The first span is determined based a distribution of the first datapoints in the first dataset and a desired number of bins. The number of processor units adjusts a second span for second bins containing second datapoints in a second dataset in the datasets to form an adjusted span that matches the first span for the first bins. The number of processor units merges the first datapoints in the first bins having the first span with the second datapoints in the second bins having the adjusted span to form a merged dataset for the histogram.

20 Claims, 9 Drawing Sheets

(56) References Cited

U.S. PATENT DOCUMENTS

| | | | | |
|---|---|---|---|---|
| 2018/0335946 | A1* | 11/2018 | Wu | G06F 16/90339 |
| 2020/0136942 | A1* | 4/2020 | Rastogi | G06F 11/3006 |
| 2021/0109949 | A1* | 4/2021 | Zbarsky | G06F 16/2471 |
| 2021/0133174 | A1* | 5/2021 | Goswami | G06F 16/2272 |
| 2022/0138554 | A1* | 5/2022 | Walters | G06N 3/045 |
| | | | | 706/19 |

OTHER PUBLICATIONS

Jung et al., "Versatile and Scalable Parallel Histogram Construction," PACT '14: Proceedings of the 23rd international conference on Parallel architectures and compilation, Aug. 2014, 13 pages.

Blomer et al., "Large-Scale Merging of Histograms using Distributed In-Memory Computing," 21st International Conference on Computing in High Energy and Nuclear Physics (CHEP2015), 2015, Journal of Physics: Conference Series, Issue 664, 7 pages. https://iopscience.iop.org/article/10.1088/1742-6596/664/9/092003/pdf.

Zhang et al., "A Fast Algorithm for Approximate Quantiles in High Speed Data," 19th International Conference on Scientific and Statistical Database Management (SSDBM 2007), Jul. 9-11, 2007, Banff, Alberta, Canada, 9 pages.

* cited by examiner

DATA MERGING IN DISTRIBUTED COMPUTING SYSTEM

BACKGROUND

1. Field

The disclosure relates generally to an improved computer system and more specifically to merging data from nodes in a distributed computing system.

2. Description of the Related Art

A distributed computing system is a digital infrastructure comprising a network of computing devices. This network performs computational tasks. Even though the computing devices in the network are physically separated, the computing devices in the network work together to process data in a distributed manner. For example, each computing device can be assigned a portion of the data for processing. In other words, the distributed system solves a problem by breaking the problem down into tasks that are distributed to computing devices of the distributed computing system for processing.

Distributed computing systems have become more and more popular over the recent years because of the scalability and flexibility provided by giving users an option to horizontally scale the distributed computing system. Traditionally, the databases that run on a single computing device require hardware upgrades to process increasing traffic. With a distributed computing system, the computing power can be increased by adding another computing device to the distributed computing system. This architecture does not require replacing existing hardware on the computing devices. Furthermore, distributed computing systems are also inherently fault tolerant and more reliable than single computing device. Here, because of the nature of multiple computing devices running for the distributed computing system simultaneously, the applications that constantly communicate with the distributed computing system can still process tasks if some of the computing devices in the distributed computing system become unavailable.

SUMMARY

According to one illustrative embodiment of the present invention, a computer implemented method is present for managing datasets for a histogram. The computer implemented method uses a number of processor units to determine a first span for first bins containing first datapoints in a first dataset in the datasets, wherein the first span is determined based a distribution of the first datapoints in the first dataset and a desired number of bins. The number of processor units adjusts a second span for second bins containing second datapoints in a second dataset in the datasets to form an adjusted span that matches the first span for the first bins. The number of processor units merges the first datapoints in the first bins having the first span with the second datapoints in the second bins having the adjusted span to form a merged dataset for the histogram. According to other illustrative embodiments, a computer system and a computer program product for managing datasets for a histogram are provided.

DETAILED DESCRIPTION

Figure 1:
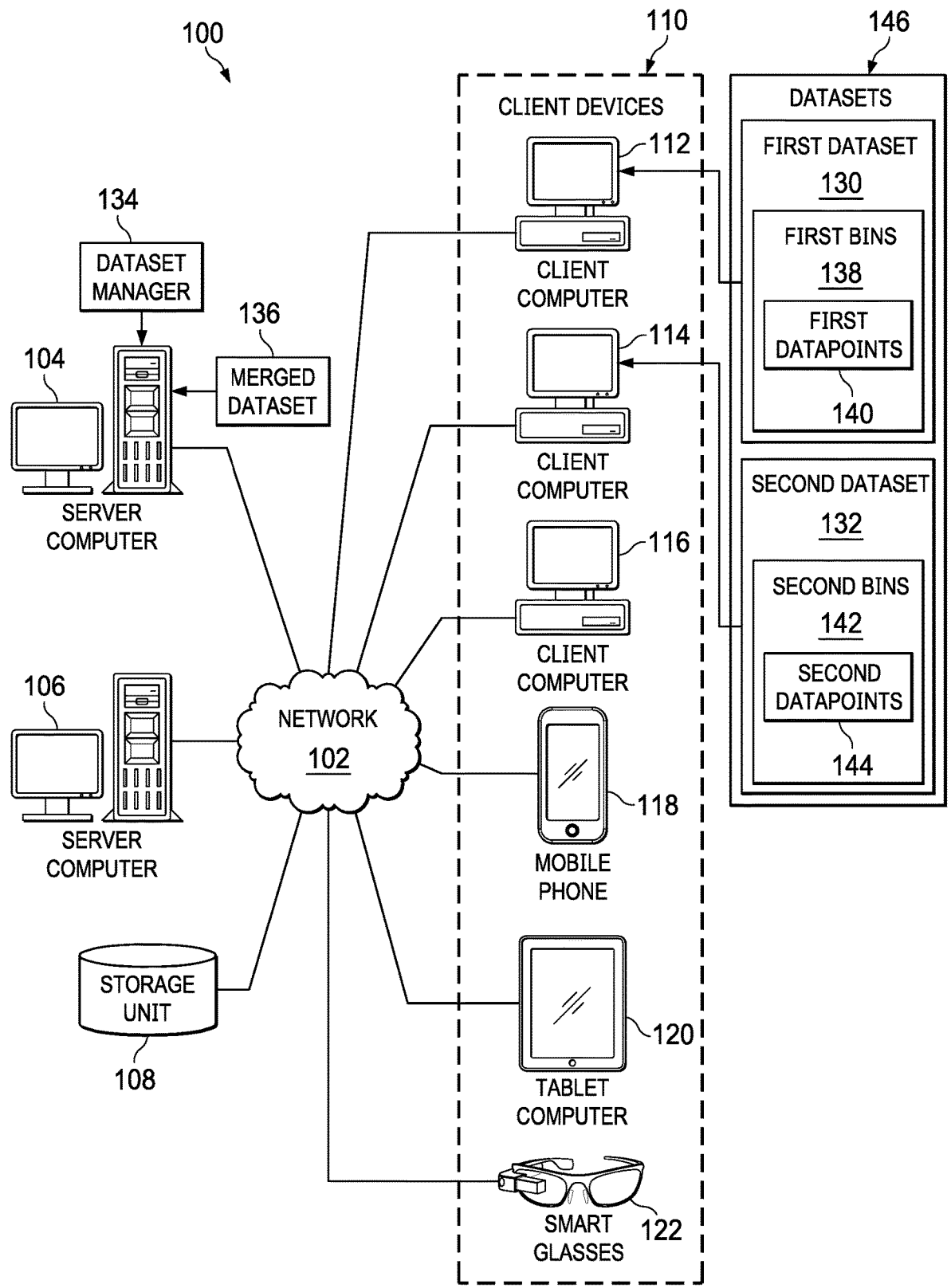
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that only limited memory is available for storing data in a distributed computing system. The illustrative embodiments recognize and take into account that data organizing algorithms can be used to achieve optimal memory utilization.

The illustrative embodiments also recognize and take into account that the span of a dataset distribution in a node of the distributed computing system can change. For example, the illustrative embodiments recognize and take into account that the span of the dataset distribution can change when a new datapoint is added to the dataset to form a new dataset distribution. As result, the illustrative embodiments recognize and take into account that existing span may not have an optimal value for the new dataset distribution, therefore an adjustment of the existing span is required to accommodate a newly added datapoint.

The illustrative embodiments also recognize and take into account that a traditional method of merging datasets in distributed computing system includes multiple scans of entire datasets, which causes delay and waste of computing resources.

The illustrative embodiments recognize and take into account that merged statistical distributions generated by datasets from different nodes of the distributed computing system usually only include an approximation of merged statistical distributions and an approximation of datapoints value within the merged statistical distributions. The illustrative embodiments recognize and take into account that the merged statistical distributions usually do not provide exact bins of which the datapoints may be located. For example, the approximation can include calculating and plotting the average value of datapoints instead of the exact value of datapoints, which can lead to a loss of accuracy in the merged statistical distributions.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In this illustrative example, storage unit 108 can be a centralized storage for network 102 that is independent of client devices in client devices 110. In another illustrative example, information can be stored and distributed manner in client devices 110, server computer 104, and server computer 106.

In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage media and downloaded to a data processing system or other device for use. For example, the program code can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In the illustrative example, the network data processing system 100 can be a distributed computing system used to process datasets 146. As depicted, dataset manager 134 runs in a device in the network 102 in server computer 104. In this illustrative example, dataset manager 134 can be used to assign portions of datasets 146 to different devices of client devices 110. In another illustrative example, dataset manager 134 can also be configured to monitor devices of client devices 110 in network 102 to ensure all portions of data are processed. It should also be understood that having dataset manager 134 running on the server computer 104 is only one embodiment of the present disclosure. For example, the dataset manager 134 can also be run in any device of client devices 110.

In this illustrative example, the datasets 146 are located in the client devices 110. Client computer 112 and client computer 114 are nodes that process datasets in a distributed computing system. In this depicted example, dataset manager 134 assigns first dataset 130 to client computer 112 for processing and dataset manager 134 assigns second dataset 132 to client computer 114.

Each dataset of the number of datasets 146 is processed in the device which they are assigned. In this illustrative example, data processing refers to the management of data, for example, performing data analysis, data organization, data visualization, data quality assurance, data retention, machine learning model training, or any suitable method of data management.

Multiple datasets processed in different devices from client devices 110 can be merged together in network data processing system 100. In this illustrative example, when client computer 112 and client computer 114 finished processing first dataset 130 and second dataset 132, first dataset 130 and second dataset 132 are sent to a third device, such as server computer 104 through network 102.

In this illustrative example, dataset manager 134 merges datasets 146 generated by client computer 112 and client computer 114 for analysis. For example, the merging of datasets 146 may be performed to generate histograms that can be analyzed or visualized. A histogram is a data structure having equal width bins. As depicted, first bins 138 in first dataset 130 and second bins 142 in second dataset 132 can have different distributions of data. Further, first bins 138 in first dataset 130 and second bins 142 in second dataset 132 can have different spans. In this illustrative example, dataset manager 134 can change the spans and number of bins for first dataset 130 and second dataset 132 such that first datapoints 140 of first bins 138 and second datapoints 144 of second bins 142 can be merged to have a desired number of bins for analysis.

Figure 2:
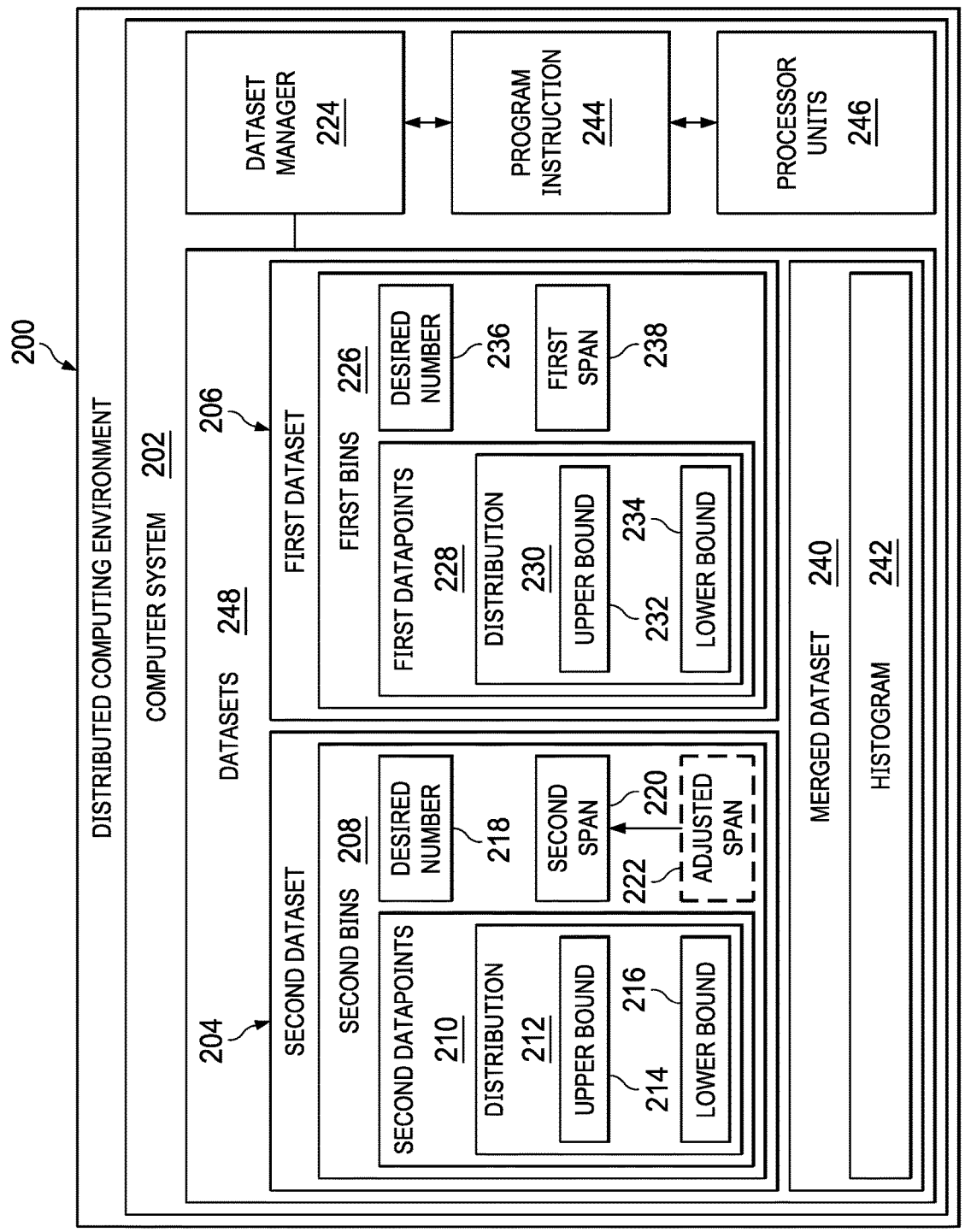
FIG. 2 is a block diagram of a distributed computing environment in accordance with an illustrative embodiment.

With reference now to FIG. 2, a block diagram of a distributed computing environment is depicted in accordance with an illustrative embodiment. In this illustrative example, distributed computing environment 200 includes components that can be implemented in hardware, such as the hardware shown in network data processing system 100 in FIG. 1.

In this illustrative example, distributed computing environment 200 includes a computer system 202 that comprises a number of different components. As depicted, computer system 202 comprises dataset manager 224. Dataset manager 224 can be used to manage dataset 248. In this example, dataset manager 224 can distribute portions of dataset 248 for processing by different devices. Dataset manager 224 can then merge dataset 248 after processing in a manner that allows for analysis of the datasets 248.

Dataset manager 224 can be implemented in software, hardware, firmware or a combination thereof. When software is used, the operations performed by dataset manager 224 can be implemented in program instructions configured to run on hardware, such as a processor unit. When firmware is used, the operations performed by dataset manager 224 can be implemented in program instructions and data and stored in persistent memory to run on a processor unit. When hardware is employed, the hardware can include circuits that operate to perform the operations in dataset manager 224.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 202 is a physical hardware system and includes one or more data processing systems. When more than one data processing system is present in computer system 202, those data processing systems are in communication with each other using a communications medium. The communications medium can be a network. The data processing systems can be selected from at least one of a computer, a server computer, a tablet computer, or some other suitable data processing system.

As depicted, computer system 202 includes a number of processor units 246 that are capable of executing program instructions 244 implementing processes in the illustrative examples. As used herein a processor unit in the number of processor units 246 is a hardware device and is comprised of hardware circuits such as those on an integrated circuit that respond and process instructions and program code that operate a computer. When a number of processor units 246 execute program instructions 244 for a process, the number of processor units 246 is one or more processor units that can be on the same computer or on different computers. In other words, the process can be distributed between processor units on the same or different computers in a computer system. Further, the number of processor units 246 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

As depicted, dataset manager 224 manages datasets in computer system 202. For example, dataset manager 224 can perform data analysis on first dataset 206 and second dataset 204, perform data visualization on first dataset 206 and second dataset 204, perform data merging of first dataset 206 and second dataset 204, and other suitable operations.

In this illustrative example, dataset manager 224 can merge first dataset 206 and second dataset 204. First dataset 206 comprises a number of first bins 226 that contains first datapoints 228. First datapoints 228 comprises a distribution 230 based on the datapoints in first datapoints 228. The distribution 230 can have upper bound 232 and lower bound 234. In this illustrative example, upper bound 232 can be determined by the datapoint in first datapoints 228 with a maximum value, and lower bound 234 can be determined by the datapoint in first datapoints 228 with a minimal value.

First bins 226 can further comprise desired number 236 that defines how many bins to include in the first bins 226. In this illustrative example, desired number 236 can be a default numerical value, or a numerical value defined by user-preference. First bins 226 also comprises first span 238 that is a width of a bin in first bins 226. In this illustrative example, the first span 238 is a numerical value defined by the distribution 230 of first datapoints 228 and desired number 236.

As depicted, dataset manager 224 can perform data visualization for the dataset in computer system 202. In this illustrative example, dataset manager 224 can generate a histogram having first bins 226 for the first dataset 206 using distribution 230 of first datapoints 228, desired number 236, and first span 238.

Similarly, second dataset 204 comprises a number of second bins 208 that contains second datapoints 210. Second datapoints 210 comprises distribution 212 based on the datapoints in the second datapoints 210. The distribution 212 can have an upper bound 214 and a lower bound 216. Similarly, the upper bound 214 can be determined by the datapoint in second datapoints 210 with a maximum value, and lower bound 216 can be determined by the datapoint in second datapoints 210 with a minimal value.

Second bins 208 can further comprise desired number 218 that defines how many bins to include in second bins 208. In this illustrative example, the desired number 218 can be a default numerical value, or a numerical value defined by user-preference. Desired number 218 can have the same value as desired number 236 of first bins 226 in first dataset 206. Second bins 208 also comprises second span 220 that is a width of a bin in second bins 208. As depicted, second span can be a numerical value defined by distribution 212 of second datapoints 210 and desired number 218.

In this illustrative example, dataset manager 224 can also generate a histogram having second bins 208 for the second dataset 204 using distribution 212 of second datapoints 210, desired number 218, and the second span 220.

As depicted, dataset manager 224 can merge first dataset 206 with second dataset 204 to form merged dataset 240. In this illustrative example, the dataset manager 224 can change the value of second span 220 to match the value of first span 238 to form adjusted span 222 for second bins 208. In this illustrative example, second span 220 can have a smaller value compared to first span 238. As a result, dataset manager 224 adjusts the width for all bins in second bins 208 based on adjusted span 222 for second bins 208. Because of the change in width of the bins in second bins 208, dataset manager 224 also places second datapoints 210 into the appropriate bins of second bins 208 after the adjustment. In this illustrative example, the dataset manager 224 then merges first dataset 206 and second dataset 204 by combining first datapoints 228 in first bins 226 and second datapoints 210 in second bins.

In this illustrative example, dataset manager 224 can also generate a histogram 242 to visualize merged dataset 240 containing first datapoints 228 and second datapoint 210.

Computer system 202 can be configured to perform at least one of the steps, operations, or actions described in the different illustrative examples using software, hardware, firmware, or a combination thereof. As a result, computer system 202 operates as a special purpose computer system in which dataset manager 224 in computer system 202 enables the managing and merging of datasets in a distributed computing system. In particular, dataset manager 224 transforms computer system 202 into a special purpose computer system as compared to currently available general computer systems that do not have dataset manager 224.

In the illustrative example, the use of dataset manager 224 in computer system 202 integrates processes into a practical application for managing connections in a manner that increases the performance of computer system 202. In other words, dataset manager 224 in computer system 202 is directed to a practical application of processes integrated into dataset manager 224 in computer system 202 that manages datasets; analyzes dataset; and merges dataset. With the use of dataset manager 224 to manage datasets, increased performance in computer system 202 can occur in providing desired data management and organization with accuracy and efficiency.

Figure 3:
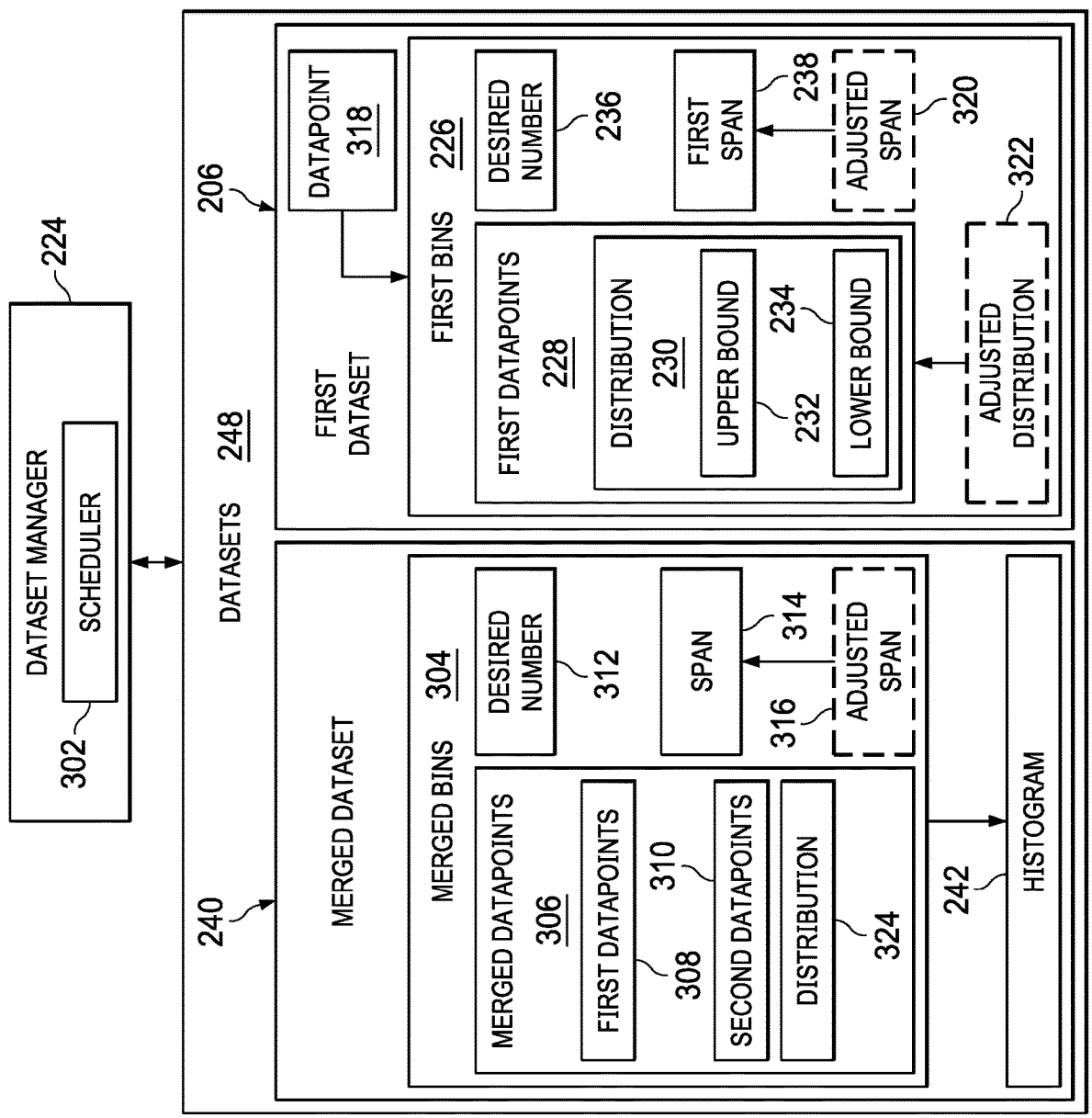
FIG. 3 is a block diagram of a merged dataset, a dataset manager, and a first dataset in accordance with an illustrative embodiment.

With reference now to FIG. 3, a diagram of a merged dataset, a dataset manager, and a first dataset is depicted in accordance with an illustrative embodiment. In the illustrative examples, the same reference numeral may be used in more than one figure. This reuse of a reference numeral in different figures represents the same element in the different figures.

In this illustrative example, dataset manager 224 comprises scheduler 302 to distribute portions of dataset 248 for processing by different devices. scheduler 302 can also merge dataset 248 after processing in a manner that allows for analysis of datasets 248.

As depicted, datasets 248 comprises merged dataset 240 and first dataset 206. In this illustrative example, merged dataset 240 comprises a number of merged bins 304 containing merged datapoints 306. Merged datapoints 306 further comprises first datapoints 308 and second datapoints 310 that are the datapoints of different datasets in dataset 248. Merged datapoints 306 comprises distribution 324 based on the datapoints in first datapoints 308 and second datapoints 310. In this illustrative example, distribution 324 can have an upper bound determined by a datapoint with a maximum value from first datapoints 308 and second datapoints 310, and a lower bound determined by the datapoint with a minimal value from first datapoints 308 and second datapoints 310.

Merged bins 304 can further comprise desired number 312 that defines how many bins are in merged bins 304. As depicted, desired number 312 can be a default numerical value, or a numerical value defined by user-preference. In this illustrative example, desired number 312 can have the same value as desired number 218 and desired number 236. Merged bins 304 also comprises span 314 that is a width of span in merged bins 304. In this illustrative example, dataset manager 224 can change span 314 upon completion of the merging of datasets in datasets 248 described above. In this example, dataset manager 224 determines adjusted span 316 for merged bins 304 based on distribution 324 and desired number 312. As a result, dataset manager 224 adjusts the width for all bins in merged bins 304 based on adjusted span 316. Because of the change in the width of bins in merged bins 304, dataset manager 224 also places first datapoints 308 and second datapoints 310 into the appropriate bins of merged bins 304 after the adjustment.

First dataset 206 can further comprise datapoint 318 to be added to first datapoints 228. In this illustrative example, dataset manager 224 recalculates the span for first datapoints 228 when a new datapoint, such as datapoint 318, is added to first datapoints 228. In this example, dataset manager 224 determines if datapoint 318 is outside of distribution 230. For example, datapoint 318 is outside of distribution 230 when it has a value larger than upper bound 232, or it has a value smaller than lower bound 234. As a result, dataset manager 224 adjusts upper bound 232 or lower bound 234 to form adjusted distribution 322. Dataset manager 224 then adjust first span 238 based on adjusted distribution 322 and desired number 236 to form adjusted span 320 that can be used to form adjusted bins for the first datasets 206.

The illustration of distributed computing environment 200 and the different components in FIGS. 2-3 are not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

It should be understood that the merging of two datasets is only one embodiment of the present disclosure. For example, the merging of more than two datasets can also be achieved by the present disclosure. In this illustrative example, the merged dataset from two datasets can be further merged with another dataset until all datasets in dataset 248 have been merged into the merged dataset.

Figure 4:
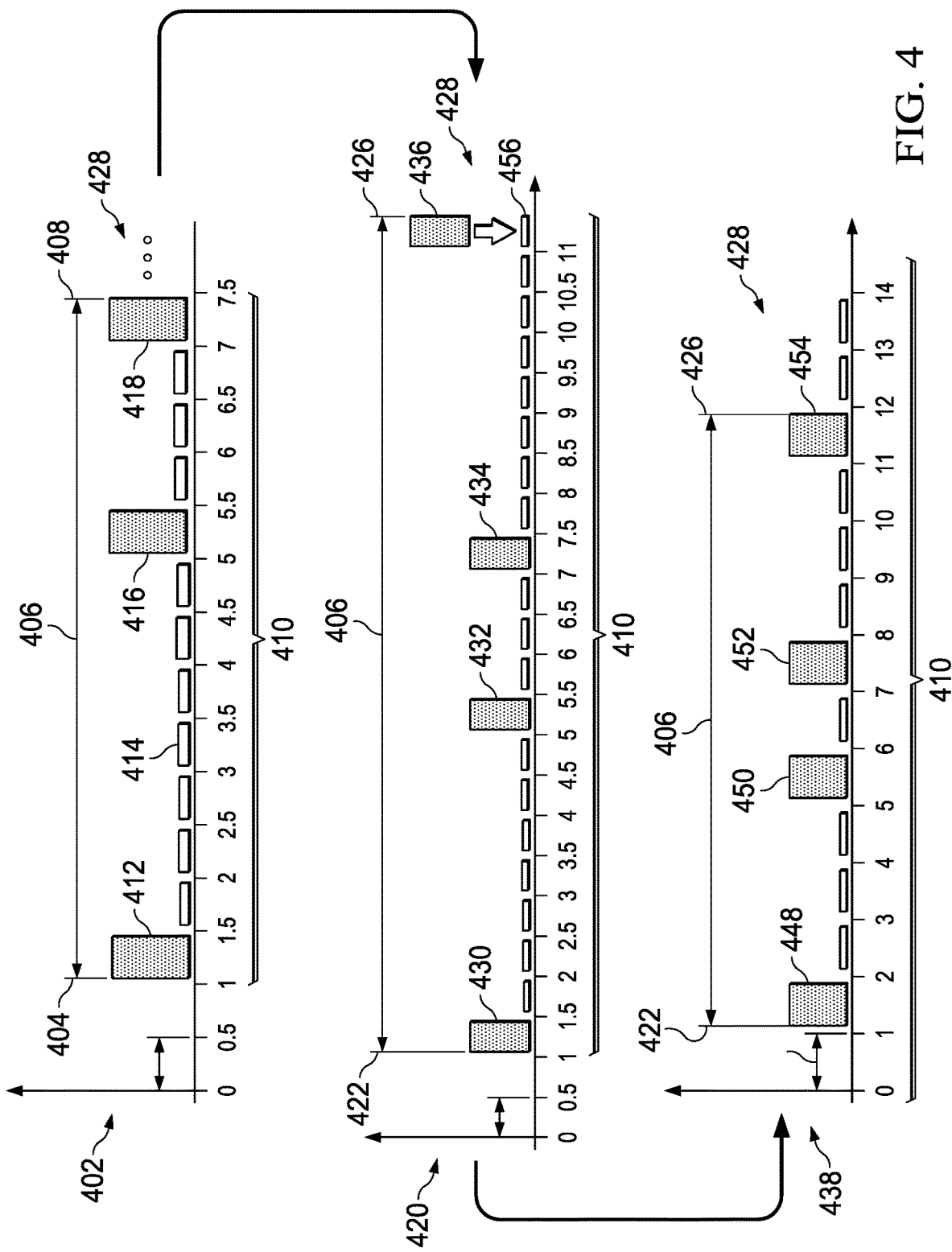
FIG. 4 is an illustration of adjusting span with histogram visualization in accordance with an illustrative embodiment.

With reference to FIG. 4, a process for adjusting spans with histogram visualization is depicted in accordance with an illustrative embodiment. In this illustrative example, a dataset is displayed in a histogram for purpose of depicting features in an illustrative embodiment.

As depicted, histogram 402 contains datapoints 428 for a dataset having distribution 406. As depicted, distribution 406 has upper bound 408 located at 7 and lower bound 404 located at 1. In this illustrative example in histogram 402, datapoints 428 are in bins 410. As depicted, bins 410 has 13 bins. In this example, the span of bin in bins 410 is 0.5.

In this illustrative example, the desired number of bins 410 is 13 and datapoints are located in 3 bins: bin 412, bin 416, and bin 418. In this illustrative example, bars located at bins in bins 410 represent datapoints and the magnitude of a bar represents how many datapoints are located at a particular bin. For example, bin 412, bin 416, and bin 418 have datapoints located in bars in these bins in bins 410. Datapoints 428 are not located in other bins 410 such as bin 414.

Distribution 406 and span of the histogram 402 may be adjusted when a new datapoint outside of the distribution 406 is added to the dataset depicted in histogram 402. In this illustrative example, histogram 420 illustrates a situation when a new datapoint is added to histogram 402. In this illustrative example, the new datapoint with a value of 11.0 is represented by bar 436 in bin 456.

In this illustrative example, the new datapoint with a value of 11.0 is outside of lower bound 404 and upper bound 408 of distribution 406. As a result, distribution 406 in histogram 420 changes when the new datapoint is added. As depicted, distribution 406 has upper bound 426 located at 11 and lower bound 422 located at 1 to include the new datapoint.

In this illustrative example, histogram 420 comprises bins 410 with span of 0.5. Bin 430, bin 432, bin 434, and bin 456 in bins 410 contain datapoints. However, bins 410 in histogram 420 has 8 more bins compared to bins 410 in histogram 402 with the change in distribution 406 to include the new datapoint in bin 456.

As depicted, 21 bins are present in bins 410 in histogram 420. In this illustrative example, the desired number of bins for bins 410 is 13. In this example, the number of bins 410 of histogram 420 exceeds the desired number of bins for this dataset.

The span and number of bins 410 can be adjusted based on the new datapoint and the desired number of bins 410. For example, histogram 438 illustrates the situation when histogram 420 changes the span for bins 410 from 0.50 to 1.0. In this illustrative example, histogram 438 has distribution 406 with upper bound 426 located at 11 and lower bound 422 located at 1. In this illustrative example, histogram 438 comprises bins 446 with span of 1.0. Here, the span is adjusted based on having datapoints in the dataset to fit the desired number of bins for bin 410.

As depicted, the desired number of bins for bin 410 is 13 and datapoints are located in 4 bins. Bins 410 has bin 448, bin 450, bin 452, and bin 454 with datapoints located in the bins. As depicted, histogram 438 has the same distribution and encompasses all of bins 410 having datapoints with lower number of bins for bin 410 compared to the number of bins for bin 410 in histogram 420.

Figure 5:
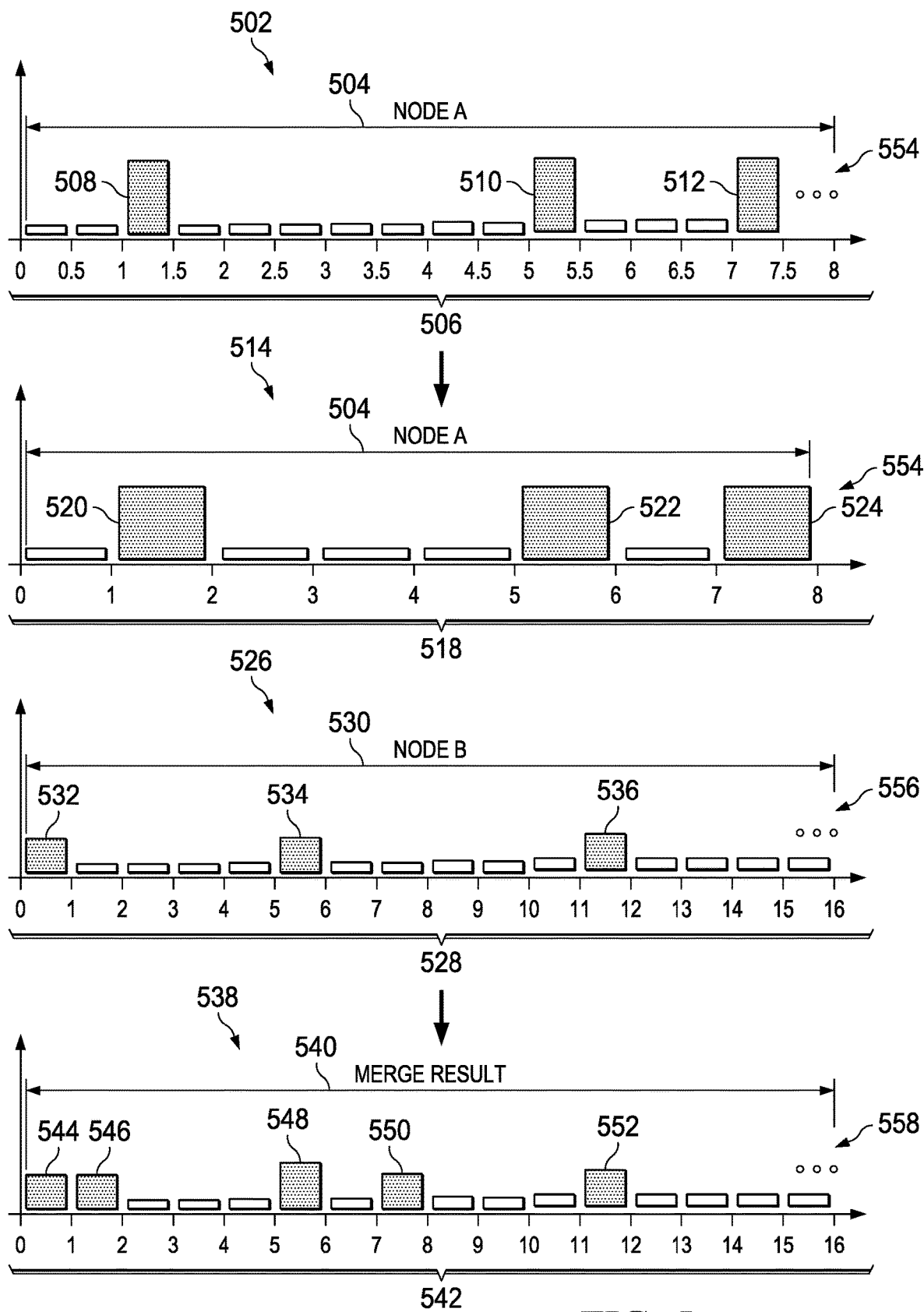
FIG. 5 is an illustration of merging datasets with histogram visualization in accordance with an illustrative embodiment.

With reference to FIG. 5, a process for merging datasets with histogram visualization is depicted in accordance with an illustrative embodiment. In this illustrative example, the datasets are displayed in histograms for the purpose of depicting features in an illustrative embodiment.

In this illustrative example, histogram 502 contains first datapoints in first dataset 554. In this illustrative example, histogram 502 has bins 506 in which each bin has a span of 0.5. As depicted in this example, first datapoints in first dataset 554 have distribution 504 with an upper bound located at 7 and a lower bound located at 1. Datapoints of first dataset 554 are located on histogram 502 at bin 508 at 1.0-1.5, bin 510 at 5.0-5.5, and bin 512 at 7.0-7.5.

In this illustrative example, histogram 526 contains second datapoints in second dataset 556. In this illustrative example, histogram 526 has bins 528 in which each bin has a span of 1.0. As depicted in this example, second datapoints in second dataset 556 have distribution 530 with an upper bound located at 11 and a lower bound located at 0. First datapoints of first dataset 554 are located on histogram 526 at bin 532 at 0-1.0, bin 534 at 5.0-6.0, and bin 536 at 11.0-12.0. In this illustrative example, histogram 502 and histogram 526 are processed and generated in different devices of a distributed computing system.

In this illustrative example, bins in the two datasets can be merged together by combining datapoints in those datasets. However, two datasets cannot be merged together when the span of those two datasets are different. For example, histogram 502 and histogram 526 cannot be merged by combining datapoints located at the bins 506 of histogram 502 to datapoints located at the bins 528 of histogram 526 because bins 506 and bins 528 are not aligned. In this illustrative example, two bins are not aligned when the side of the bins between the two datasets are not aligned. For example, datapoints in bin 510 in bins 506 at 5.0-5.5 cannot be merged with datapoints in bin 534 in bins 528 at 5.0-6.0 because it is unclear whether the datapoints in bin 534 in bins 528 is located at 5.0-5.5 or 5.5-6.0.

In this case, the matching of spans of two datasets is needed before those two datasets can be merged together. In this illustrative example, the matching of spans is achieved by changing the span of one dataset to match the span of the other dataset. For example, bins 506 of histogram 502 can be aligned with bins 528 of histogram 526 by adjusting the span of bins 506 to match the span of bins 528.

In this illustrative example, the adjustment of bins 506 of histogram 502 can be achieved by using the process described in FIG. 4 to form a histogram 514. As depicted, histogram 514 contains datapoints in first dataset 554. In this illustrative example, histogram 514 has bins 518 in which each bin has a span of 1.0. As depicted in this example, the first datapoints in first dataset 554 have distribution 504 with an upper bound located at 7 and a lower bound located at 1. The first datapoints in first dataset 554 are located on histogram 514 at bin 520 at 1.0-2.0, bin 522 at 5.0-6.0, and bin 524 at 7.0-8.0.

In this illustrative example, histogram 514 can be merged with histogram 526 by combining the first datapoints in bin 520, bin 522, and bin 524 of histogram 514 to the second datapoints in bin 532, bin 534, and bin 536 of histogram 526 to form a merged histogram 538 of a merged dataset 558.

In this illustrative example, the merged histogram 538 contains datapoints in both first dataset 554 and second dataset 556. In this illustrative example, histogram 538 has bins 542 in which each bin has a span of 1.0. As depicted in this example, histogram 538 has distribution 540 based on a lower bound determined by the smaller lower bound from distribution 504 and distribution 530, and an upper bound determined by the higher upper bound from distribution 504 and distribution 530. In this case, distribution 540 has an upper bound located at 11 and a lower bound located at 0.

Datapoints in merged histogram 538 are located on histogram 526 at bin 544 at 0-1.0, bin 546 at 1.0-2.0, bin 548 at 5.0-6.0, bin 550 at 7.0-8.0, and bin 552 at 11.0-12.0. In this illustrative example, the magnitude of datapoints at each bin of bins 542 are a combined magnitude of datapoints from bin 518 and bins 528. As a result, bin 548 has datapoints of higher magnitude compared to bin 544, bin 546, bin 550, and bin 552 because datapoints are presents in both bin 522 of bins 518 and bin 534 of bins 528.

In some illustrative examples, the merged histogram 538 for merged dataset 558 can further adjust the span of bins 542 to have the desired number of bins 542. The datapoints in merged dataset 558 can be reallocated in bins 542 based on changing the span of bins 542 to have the desired number of bins 542 based on changing the span of bins 542 to have the desired number of bins 542 within distribution 406. In this illustrative example, the adjustment can be achieved by using the process described in FIG. 4.

Figure 6:
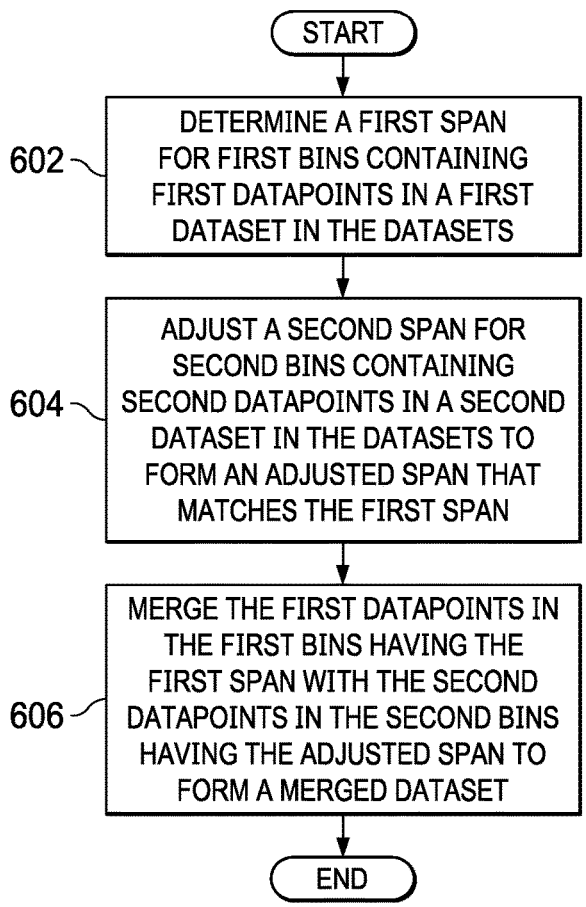
FIG. 6 is a flowchart of a process for merging datasets in accordance with an illustrative embodiment.

Turning next to FIG. 6, a flowchart of a process for merging datasets is depicted in accordance with an illustrative embodiment. The process in FIG. 6 can be implemented in hardware, software, or both. When implemented in software, the process can take the form of program instructions that is run by one of more processor units located in one or more hardware devices in one or more computer systems. For example, the process can be implemented in dataset manager 224 in computer system 202 in FIG. 2.

The process begins by determining a first span for first bins containing first datapoints in a first dataset in the datasets (step 602). The process adjusts a second span for second bins containing second datapoints in a second dataset in the datasets to form an adjusted span that matches the first span (step 604).

Next, the process merges the first datapoints in the first bins having the first span with the second datapoints in the second bins having the adjusted span to form a merged dataset (step 606). The process terminates thereafter.

Figure 7:
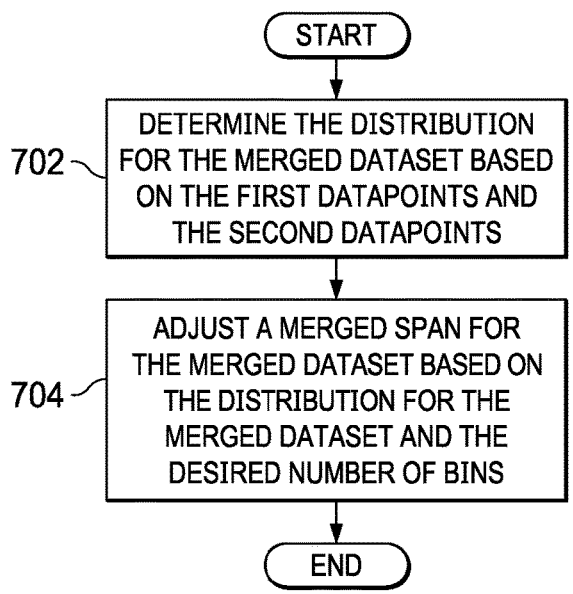
FIG. 7 is flowchart of a process for adjusting span for merged dataset in accordance with an illustrative embodiment.

With reference to FIG. 7, a flowchart of a process for adjusting spans for merged dataset is depicted in accordance with an illustrative embodiment. The process in FIG. 7 is an example of additional steps that can be performed with the process in FIG. 6.

The process determines a distribution for the merged dataset based on the first datapoints and the second datapoints (step 702). In step 702, the distribution for the merged dataset can be determined by identifying the difference between the maximum datapoint and the minimal datapoint of all datapoints in first datapoints and second datapoints.

The process adjusts a merged span for the merged dataset based on the distribution for the merged dataset and the desired number of bins (step 704). As depicted, the desired number of bins represents how many bins are to be included in the merged dataset. In this illustrative example, the desired number can be a default numerical value, or a numerical value defined by user-preference. The process terminates thereafter.

Figure 8:
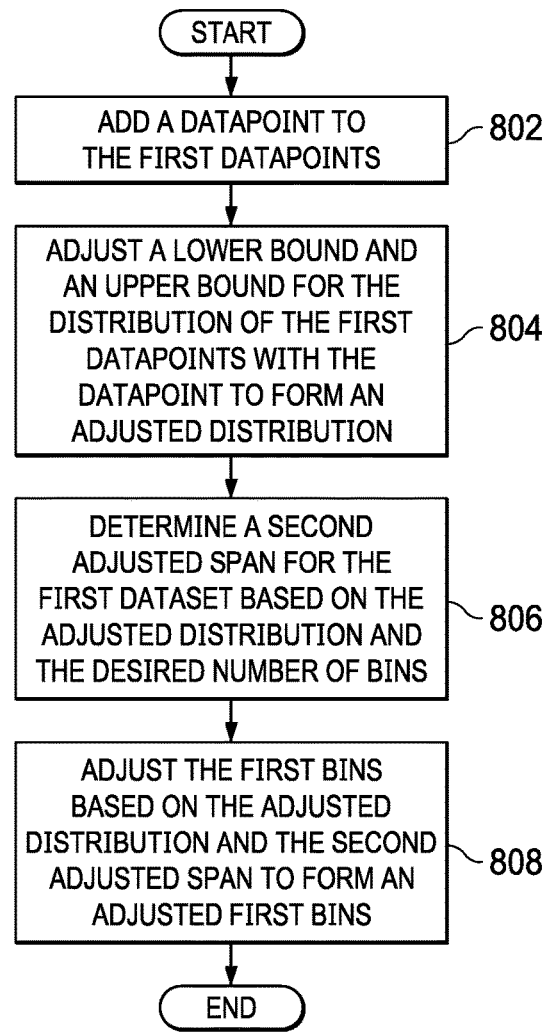
FIG. 8 is flowchart of a process for adjusting span for a dataset in accordance with an illustrative embodiment.

With reference to FIG. 8, a flowchart of a process for adjusting span for a dataset is depicted in accordance with an illustrative embodiment. The process in FIG. 8 is an example of one implementation for step 602 in FIG. 6.

The process adds a datapoint to the first datapoints (step 802). The process adjusts a lower bound and an upper bound for the distribution of the first datapoints with the datapoint to form an adjusted distribution (step 804). The process then determines a second adjusted span for the first dataset based on the adjusted distribution and the desired number of bins (step 806).

The process adjusts the first bins based on the adjusted distribution and the second adjusted span to form an adjusted first bins (step 808). The process terminates thereafter.

Figure 9:
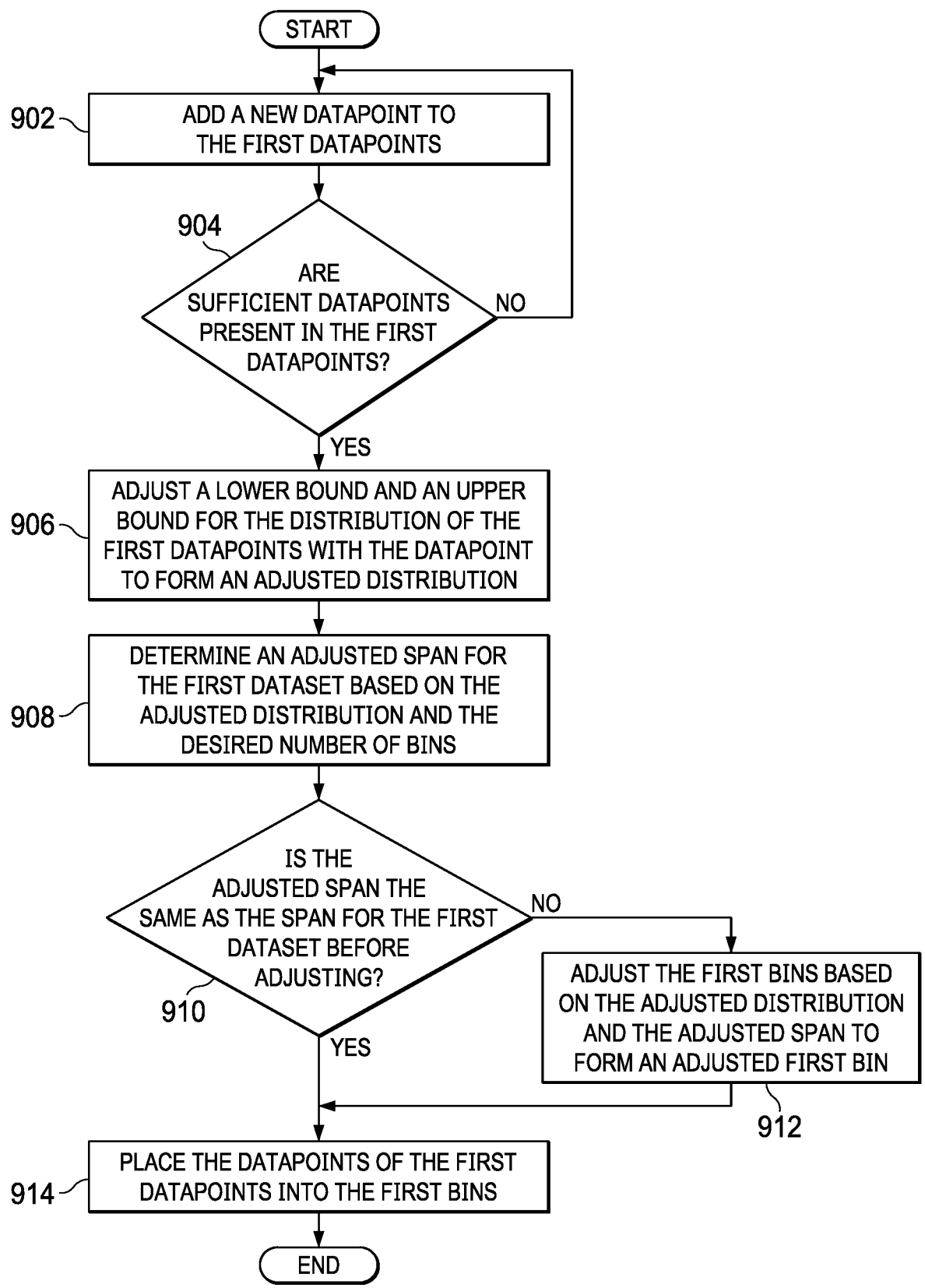
FIG. 9 is flowchart of a process for adjusting a span for a dataset in accordance with an illustrative embodiment.

With reference to FIG. 9, a flowchart of process for adjusting a span for a dataset is depicted in accordance with an illustrative embodiment. The process in FIG. 9 can be implemented in hardware, software, or both. When implemented in software, the process can take the form of program instructions that is run by one of more processor units located in one or more hardware devices in one or more computer systems. For example, the process can be implemented in dataset manager 224 in computer system 202 in FIG. 2.

The process begins by adding a new datapoint to the first datapoints (step 902). In this illustrative example, the first datapoints can be datapoints of a dataset that have been assigned to a device in the distributed computing system for processing. The process determines whether sufficient datapoints are present in the first datapoints (step 904). In step 904, the sufficiency of datapoints can be determined by whether the number of datapoints present in the first datapoints exceeds a threshold. This threshold can be defined by user preferences, in configuration information, or from some other source. If the number of datapoints does not exceed the threshold, the process returns to step 902 and add another datapoints to the first datapoints.

Otherwise, the process adjusts a lower bound and an upper bound for the distribution of the first datapoints with the datapoint to form an adjusted distribution for the first datapoints (step 906). In step 906, the distribution of the first datapoints can be determined based on a lower bound defined by a datapoint with minimal value in the first datapoints, and an upper bound defined by a datapoint with maximum value in the first datapoints. In this illustrative example, the new datapoint can change the distribution of the first datapoints. For example, when a new datapoint is outside of the current distribution, the current distribution is adjusted by adjusting the lower bound to a lower level or adjusting the upper bound to be a higher level depending on the location of the new datapoint in the distribution.

In another example, the new datapoint can have a value within the distribution of the first datapoints. In this case, the lower bound and the upper bound of the first datapoint is not adjusted.

The process determines an adjusted span for the first dataset based on the adjusted distribution and desired number of bins (step 908). In this illustrative example, the adjusted span can be determined using a number of different mechanisms, for example, a function of (Max-Min)/bins can be used. With this function, the (Max-Min) is the difference between upper bound and lower bound of the adjusted distribution and the bins is the desired number of bins. In another illustrative example, the calculated value for adjusting the span can be rounded to a value of $2^n$, where n is an integer. For example, if the calculated value is 0.6, this value can be rounded to 0.5, which is $2^{-1}$. In another example, if the calculated value is 3.8, this value can be rounded to 4, which is $2^2$. In yet another illustrative example, the calculated value for adjusting the span can be rounded to a value of $X^n$, where x and n are integers.

The process then determines whether the adjusted span is the same as the span for the first dataset before adjusting (step 910). As described above, the new datapoint can have a value within the distribution of the first datapoints. With this new datapoint, changes in the lower bound and the upper bound of the first datapoints are not needed. As a result, the value of adjusted span for the first dataset is the same as the value for the span for the first dataset before the new datapoint is added to the first datapoints. If the adjusted span is the same as the span for the first dataset, the process places the datapoints of the first datapoints into appropriate bins of the first bins (step 914). The process terminates thereafter.

Turning back to step 910, if the adjusted span is not the same as the span for the first dataset, the process adjusts the first bins based on the adjusted distribution and the adjusted span to form an adjusted first bins (step 912). In step 912, the first bins are adjusted to have a width equal to the value of the adjusted span for the first dataset. The process then proceeds to step 914, as described above. The process terminates thereafter.

Figure 10:
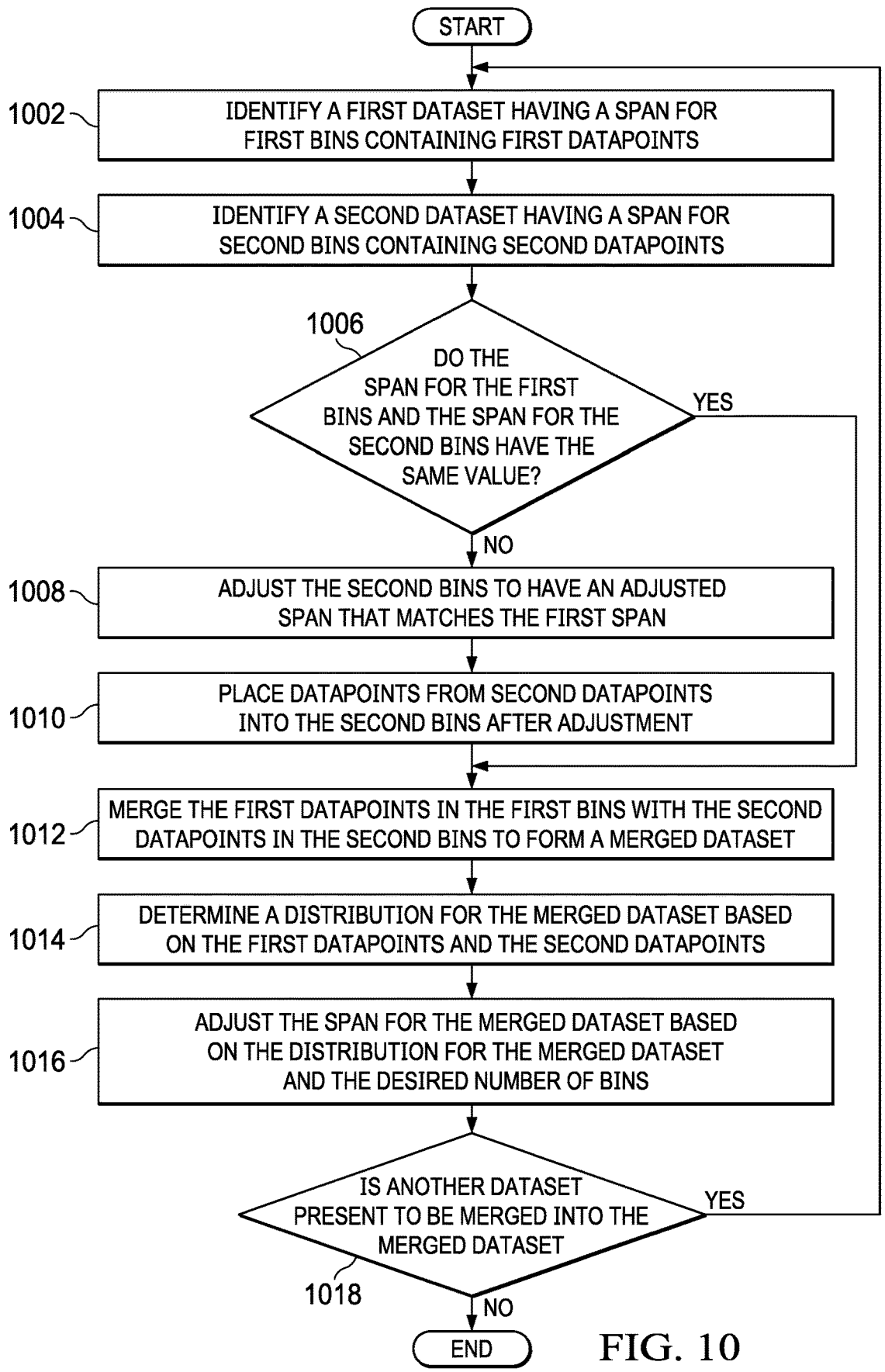
FIG. 10 is flowchart of a process for merging datasets in accordance with an illustrative embodiment.

With reference to FIG. 10, a flowchart of process for merging datasets is depicted in accordance with an illustrative embodiment. The process in FIG. 10 can be implemented in hardware, software, or both. When implemented in software, the process can take the form of program instructions that is run by one of more processor units located in one or more hardware devices in one or more computer systems. For example, the process can be implemented in dataset manager 224 in computer system 202 in FIG. 2.

The process begins by identifying a first dataset having a span for first bins containing first datapoints (step 1002), and identifying a second dataset having a span for second bins containing second datapoints (step 1004). In this illustrative example, a dataset can be divided into a number of datasets that contains the first dataset and the second dataset. The first dataset and the second dataset can be assigned to different devices in a distributed computing system for processing.

The process determines whether the span for the first bin and the span for the second bins have same value (step 1006). If the span for the first bins and the span for the second bins do not have the same value, the process adjusts the second bins to have an adjusted span that matches the first span (step 1008). In this illustrative example, the second span can have a smaller value compared to the first span. As a result, the second bins can also be adjusted because of the changes in value.

The process places datapoints from second datapoints into the appropriate second bins after adjustment (step 1010). The process then proceeds to merge the first datapoints in the first bins with the second datapoints in the second bins to form a merged dataset (step 1012). In this illustrative example, the merged dataset can have a span with a value equal to the value of the first span for the first dataset.

The process determines a distribution for the merged dataset based on the first datapoints and second datapoints (step 1014). In step 1014, the distribution of the merged dataset can be determined based on a lower bound defined by a datapoint with minimal value in the first datapoints and the second datapoints, and an upper bound defined by a datapoint with maximum value in the first datapoints and the second datapoints.

The process then adjusts the span for the merged dataset based on the distribution for the merged dataset and the desired number of bins (step 1016). As depicted, the adjusted span can be determined using a number of different mechanisms, for example, a function of (Max-Min)/bins can be used. With this function, the (Max-Min) is the difference between an upper bound and a lower bound of the distribution for the merged dataset and the bins is the desired number of bins. In another illustrative example, the calculated value for adjusting the span for the merged dataset can be rounded to a value of $2^n$, where n is an integer.

The process determines whether another dataset is present to be merged into the merged dataset (step 1018). As depicted, the first dataset and the second dataset are a part of the number of datasets. In this illustrative example, the merged dataset containing the first dataset and the second dataset can be further merged with another dataset from the number of datasets until all datasets in the number of datasets are merged together. In this case, the process repeats step 1002 to step 1018 when another dataset from the number of datasets can be identified for merging. Otherwise, the process terminates thereafter.

Turning back to step 1006, if the span for the first bins and the span for the second bins have the same value, the process proceeds to step 1012, as described above.

Figure 11:
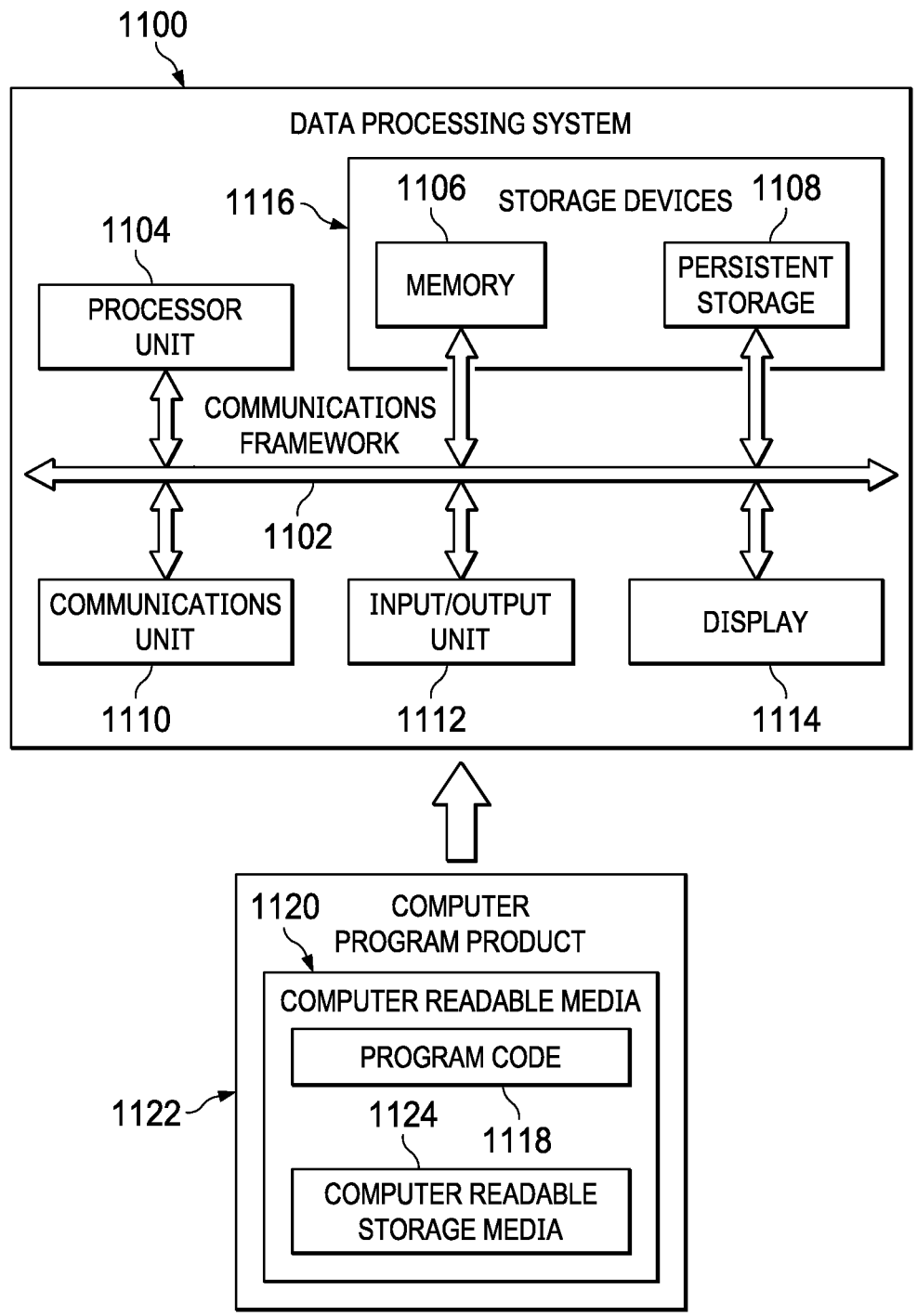
FIG. 11 is a block diagram of a data processing system in accordance with an illustrative embodiment.

Turning now to FIG. 11, a block diagram of a data processing system is depicted in accordance with an illustrative embodiment. Data processing system 1100 can be used to implement server computer 104, server computer 106, client devices 110, in FIG. 1. Data processing system 1100 can be used to implement computers system 202 in FIG. 2 In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that can be loaded into memory 1106. Processor unit 1104 includes one or more processors. For example, processor unit 1104 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1104 can may be implemented using one or more heterogeneous processor systems in which a main processor is present with secondary processors on a single chip. As another illustrative example, processor unit 1104 can be a symmetric multi-processor system containing multiple processors of the same type on a single chip.

Memory 1106 and persistent storage 1108 are examples of storage devices 1116. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, can be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 can be a hard drive, a solid-state drive (SSD), a flash memory, a rewritable optical disk, a rewritable magnetic tape, or some combination of the above. The media used by persistent storage 1108 also can be removable. For example, a removable hard drive can be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that can be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs can be located in storage devices 1116, which are in communication with processor unit 1104 through communications framework 1102. The processes of the different embodiments can be performed by processor unit 1104 using computer-implemented instructions, which may be located in a memory, such as memory 1106.

These instructions are referred to as program instructions, computer usable program instructions, or computer-readable program instructions that can be read and executed by a processor in processor unit 1104. The program instructions in the different embodiments can be embodied on different physical or computer-readable storage media, such as memory 1106 or persistent storage 1108.

Program instructions 1118 is located in a functional form on computer-readable media 1120 that is selectively removable and can be loaded onto or transferred to data processing system 1100 for execution by processor unit 1104. Program instructions 1118 and computer-readable media 1120 form computer program product 1122 in these illustrative examples. In the illustrative example, computer-readable media 1120 is computer-readable storage media 1124.

Computer-readable storage media 1124 is a physical or tangible storage device used to store program instructions 1118 rather than a medium that propagates or transmits program instructions 1118. Computer readable storage media 1124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1118 can be transferred to data processing system 1100 using a computer-readable signal media. The computer-readable signal media are signals and can be, for example, a propagated data signal containing program instructions 1118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1120" can be singular or plural. For example, program instructions 1118 can be located in computer-readable media 1120 in the form of a single storage device or system. In another example, program instructions 1118 can be located in computer-readable media 1120 that is distributed in multiple data processing systems. In other words, some instructions in program instructions 1118 can be located in one data processing system while other instructions in program instructions 1118 can be located in one data processing system. For example, a portion of program instructions 1118 can be located in computer-readable media 1120 in a server computer while another portion of program instructions 1118 can be located in computer-readable media 1120 located in a set of client computers.

The different components illustrated for data processing system 1100 are not meant to provide architectural limitations to the manner in which different embodiments can be implemented. In some illustrative examples, one or more of the components may be incorporated in or otherwise form a portion of, another component. For example, memory 1106, or portions thereof, may be incorporated in processor unit 1104 in some illustrative examples. The different illustrative embodiments can be implemented in a data processing system including components in addition to or in place of those illustrated for data processing system 1100. Other components shown in FIG. 11 can be varied from the illustrative examples shown. The different embodiments can be implemented using any hardware device or system capable of running program instructions 1118.

Thus, illustrative embodiments of the present invention provide a computer implemented method, computer system, and computer program product for managing connections in a connection pool. A number of processor units monitor connection requests to access a set of backend resources. The number of processor units identify request groups for the connection requests based on authentication data in the connection requests. The number of processor units analyze the connection requests to identify a usage trend for connections by the request groups. The number of processor units predict the usage trend of the connections for a set of time slots to form a predicted usage trend for connections for a period of time. The number of processor units manage a connection pool based on the predicted usage trend for the connections over a period of time.

As a result, increased performance in managing connection pools can be achieved. In the illustrative example, predicting usage of connections and creating allocations of connections in a connection pool according to the predictions can automatically predict authentication needs in the connection pool. As a result, the allocation of connections can more closely track requests for connections.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for managing datasets for a histogram, the computer implemented method comprising a number of processing units in a computer:
    determining a first span for first bins containing first datapoints in a first dataset in the datasets, wherein the first span is determined based on a first distribution of the first datapoints in the first dataset and a desired number of bins;
    adding a datapoint to the first datapoints in the first dataset, wherein the first distribution of the first datapoints has a lower bound and an upper bound comprising the first datapoints;
    adjusting the lower bound and the upper bound for the first distribution of the first datapoints with the datapoint to form an adjusted distribution for the first datapoints;
    determining a second adjusted span for the first dataset based on the adjusted distribution and the desired number of bins;
    adjusting the first bins based on the adjusted distribution and the second adjusted span to form an adjusted first bins containing the first datapoints;
    adjusting a second span for second bins containing second datapoints in a second dataset in the datasets to form an adjusted span that matches the first span for the first bins, wherein the second span is determined based on a second distribution of the second datapoints in the second dataset, and wherein the second distribution differs from the first distribution; and merging the first datapoints in the first bins having the first span with the second datapoints in the second bins having the adjusted span to form a merged dataset for the histogram.

2. The computer implemented method of claim 1, further comprising
determining, by the number of processor units, a distribution for the merged dataset based on the first datapoints and the second datapoints.

3. The computer implemented method of claim 2, wherein the datapoint is outside of the first distribution of the first datapoints before the adding the datapoint to the first datapoints.

4. The computer implemented method of claim 1, further comprising:
determining, by the number of processor units, a distribution for the merged dataset based on the first datapoints and the second datapoints; and
adjusting, by the number of processor units, a merged span for the merged dataset based on the distribution for the merged dataset and the desired number of bins.

5. The computer implemented method of claim 1, wherein the first dataset and second dataset are processed in different devices of a distributed computing system.

6. The computer implemented method of claim 1, wherein the second span of the second dataset is smaller than the first span of the first dataset, and wherein the second datapoints and the second bins of the second dataset are adjusted based on the adjusted span before merging.

7. The computer implemented method of claim 1, wherein the first span and the second span have a value equal to $2^n$, where n is an integer.

8. A computer system configured to manage datasets for a histogram, wherein the computer system comprises:
a storage device that stores program instructions; and
a number of processor units in communication with the storage device and configured to execute program instructions to:
determine a first span for first bins containing first datapoints in a first dataset in the datasets, wherein the first span is determined based a first distribution of the first datapoints in the first dataset and a desired number of bins;
add a datapoint to the first datapoints in the first dataset, wherein the first distribution of the first datapoints has a lower bound and an upper bound comprising the first datapoints;
adjust the lower bound and the upper bound for the first distribution of the first datapoints with the datapoint to form an adjusted distribution for the first datapoints;
determine a second adjusted span for the first dataset based on the adjusted distribution and the desired number of bins;
adjust the first bins based on the adjusted distribution and the second adjusted span to form an adjusted first bins containing the first datapoints;
adjust a second span for second bins containing second datapoints in a second dataset in the datasets to form an adjusted span that matches the first span for the first bins, wherein the second span is determined based on a second distribution of the second datapoints in the second dataset, and wherein the second distribution differs from the first distribution; and
merge the first datapoints in the first bins having the first span with the second datapoints in the second bins having the adjusted span to form a merged dataset for the histogram.

9. The computer system of claim 8, wherein the number of processor units are further configured to execute program instructions to determine a distribution for the merged dataset based on the first datapoints and the second datapoints.

10. The computer system of claim 8, wherein the datapoint is outside of the first distribution of the first datapoints before an addition of the datapoint to the first datapoints.

11. The computer system of claim 8, wherein the number of processor units executes program instructions to:
determine a distribution for the merged dataset based on the first datapoints and the second datapoints; and
adjust a merged span for the merged dataset based on the distribution for the merged dataset and the desired number of bins.

12. The computer system of claim 8, wherein the first dataset and second dataset are processed in different devices of a distributed computing system.

13. The computer system of claim 8, wherein the second span of the second dataset is smaller than the first span of the first dataset, and wherein the second datapoints and the second bins of the second dataset are adjusted based on the adjusted span before merging.

14. The computer system of claim 8, wherein the first span and the second span have a value equal to $2^n$, where n is an integer.

15. A computer program product configured to manage datasets for a histogram, wherein the computer program product comprises a computer-readable storage medium that comprises program instructions embodied therewith, the program instructions configured for execution by a number of processors in a computer system-to:
determine a first span for first bins that contain first datapoints in a first dataset in datasets, wherein the first span is determined based on a first distribution of the first datapoints in the first dataset and a desired number of bins;
add a datapoint to the first datapoints in the first dataset, wherein the first distribution of the first datapoints has a lower bound and an upper bound that comprises the first datapoints;
adjust the lower bound and the upper bound for the first distribution of the first datapoints with the datapoint to form an adjusted distribution for the first datapoints;
determine a second adjusted span for the first dataset based on the adjusted distribution and the desired number of bins; and
adjust the first bins based on the adjusted distribution and the second adjusted span to form an adjusted first bins containing the first datapoints;
adjust, a second span for second bins containing second datapoints in a second dataset in the datasets to form an adjusted span that matches the first span for the first bins, wherein the second span is determined based on a second distribution of the second datapoints in the second dataset, and wherein the second distribution differs from the first distribution; and
merge, the first datapoints in the first bins that comprise the first span with the second datapoints in the second bins that comprise the adjusted span to form a merged dataset for the histogram.

16. The computer program product of claim 15, wherein the number of processor units are further configured to determine a distribution for the merged dataset based on the first datapoints and the second datapoints.

17. The computer program product of claim 16, wherein the datapoint is outside of the first distribution of the first datapoints before the adding the datapoint to the first datapoints.

18. The computer program product of claim 15, further configured to:
 determine a distribution for the merged dataset based on the first datapoints and the second datapoints; and
 adjust a merged span for the merged dataset based on the distribution for the merged dataset and the desired number of bins.

19. The computer program product of claim 15, wherein the first dataset and second dataset are processed in different devices of a distributed computing system.

20. The computer program product of claim 15, wherein the second span of the second dataset is smaller than the first span of the first dataset, and wherein the second datapoints and the second bins of the second dataset are adjusted based on the adjusted span before merging.

* * * * *